2,819,244

COMPOSITIONS OF MATTER COMPRISING ACETONE-FORMALDEHYDE REACTION PRODUCTS AND LIQUID POLYSULPHIDE POLYMERS

Mortimer T. Harvey, South Orange, and Peter L. Rosamilia, Newark, N. J., assignors to Harvel Research Corporation, a corporation of New Jersey No Drawing. Application June 30, 1953
Serial No. 365,251

5 Claims. (Cl. 260—42)

This invention relates to novel compositions of matter and to methods for preparing them as well as to articles of manufacture in which one or a combination of two or more of them may be employed as components. In one of its more specific aspects, the invention is directed to improving certain properties of various "Thiokols."

In the course of our experimentations with normally liquid polymers of "Thiokol" having an average molecular weight between about 300 and 4,000 and available on the market as Thiokol liquid polymer ZL–100, LP–3, and LP–2, we have discovered that by combining therewith acetone-formaldehyde resinous reaction products and such combinations are converted to the substantially solid state, there may be produced substantially solid or rubbery products which have high heat resistance characteristics. We have discovered that the use of such acetone-formaldehyde resinous reaction products combined with said polymers and converted to the substantially solid or rubbery state surprisingly imparts to the mass exceptional resistance to fusion at relatively high temperature when compared with the temperature of fusion of said polymers converted to the substantially solid or rubbery state but in the absence of said acetone-formaldehyde resinous reaction products.

The "Thiokol" liquid polymers employed herein in the practice of this invention are those of such chemical structure that the repeating unit in the polymer chain is —SSCH$_2$CH$_2$OCH$_2$OCH$_2$CH$_2$— and the terminals being the reactive SH groups. These liquid polymers can be classified as polymeric dimercaptans. The acetone-formaldehyde resinous organic reaction products may be produced by reacting acetone and formaldehyde to which has been added a quantity of an alkaline catalyst, for example sodium hydroxide, potassium hydroxide and the like. The ratio of acetone to formaldehyde employed in the reaction is in the proportion of 1 mole of acetone to 2–6 moles of formaldehyde.

The general procedure which is employed in the production of the acetone-formaldehyde reaction products is as follows:

Example 1

(1 mole acetone to 2–6 moles formaldehyde)

Employing a closed steel kettle with a scraper agitator and a reflux condenser, there is heated while the scraping stirrer is in motion all of the acetone and formaldehyde which is in aqueous solution. In a separate container there is prepared an aqueous solution of the required amount of alkaline catalyst to be employed. One quarter of the alkaline solution is added to the agitated acetone and formaldehyde mixture. Then steam is applied to the jacket of the reaction vessel for a short period of time whereupon an exothermic reaction between the acetone and formaldehyde is initiated. The steam is cut off when the temperature of the mass reaches approximately 120–135° F. and the cold water is passed through the jacket to maintain the temperature of the reacting mass, which is proceeding exothermically, at a value no greater than about 210° F. When the temperature of the reacting mass falls to about 140° F. due to the continued cold water flow through the jacket, the second one-quarter of the aqueous solution of alkali is added and the reaction again proceeds violently exothermically and the temperature rises and then drops. When it again reaches a value of approximately 140° F., the same procedure is followed in adding the last two one-quarters of the aqueous alkaline solution. After the last one-quarter of aqueous alkaline solution has been added and the subsequent exothermic reaction has taken place, the mass is no longer alkaline and its temperature has dropped to about 140° F. Then the mass is dehydrated under reduced pressure conditions. This may be accomplished by heating the mass up to a temperature of approximately 160–175° F. while under a vacuum of approximately 29" of mercury, when the resultant mass will be found to to a substantially anhydrous, resinous acetone-formaldehyde reaction product. Such organic reaction mass is characterized as being a free-flowing liquid resinous mass which when mixed with 20 parts by weight of a 1–1 aqueous dispersion of lime per 100 parts by weight thereof will be converted at room temperature when allowed to stand overnight to the solid, substantially infusible state.

Example 2

(1 mole acetone to 3 moles formaldehyde)

Following the same procedure as that set forth in Example 1 and employing 30 parts by weight of acetone and 126 parts by weight of an aqueous solution of formaldehyde (37% concentration) and approximately 2 parts of sodium hydroxide in 4 parts of water, there is produced a substantially anhydrous acetone-formaldehyde organic reaction mass hereinafter known as Product AF–1.

Example 3

(1 mole acetone to 4 moles of formaldehyde)

Following the same procedure as that set forth in Example 1 and employing 300 parts by weight of acetone and 1700 parts by weight of an aqueous solution of formaldehyde (37% concentration) and approximately 25 parts of sodium hydroxide in 60 parts of water, there is produced an acetone-formaldehyde organic resinous reaction mass hereinafter known as Product AF–2.

Example 4

(1 mole of acetone to 5 moles of formaldehyde)

Employing the same procedure as that set forth in Example 1 and using 30 parts by weight of acetone and 212 parts by weight of an aqueous solution of formaldehyde (37% concentration) and approximately 4 parts of sodium hydroxide in 8 parts of water, there is produced an acetone-formaldehyde organic reaction mass hereinafter known as Product AF–3.

According to this invention, one or a combination of two or more of said acetone-formaldehyde organic reaction masses produced in the presence of an alkaline condensing agent, the ratio of acetone to formaldehyde being within the limits heretofore set forth and examples of which are Products AF–1, AF–2, and AF–3, may be combined with said "Thiokol" liquid polymers. Such combinations which are normally liquid may be converted to the substantially solid state by adding thereto a curing agent, examples of which are the metallic oxides in the presence of hexamethylene tetramine as well as the organic peroxides, examples of which are zinc oxide and hexamethylene tetramine, lead peroxide alone, benzoyl peroxide, tertiary butyl hydroperoxide, tertiary butyl perbenzoate and cumene hydroperoxide. In general, the ratio by weight of the "Thiokol" liquid polymers to the acetone-formaldehyde reaction mass is in the range of 100 parts of the former to 5–100 parts of the latter. In producing these normally solid compositions of this invention, we prefer to employ lead peroxide as the curing agent and for purposes we employ approximately 7.5–15 parts thereof for each 100 parts of the combined weights of the "Thiokol" liquid polymer and the acetone-formaldehyde reaction masses used. Such tri-component mixtures may be allowed to stand for a period of approximately 72 hours and at the end of that period the originally liquid mass will be found to have been converted to the substantially solid state whose rubbery nature may vary depending upon the proportion of acetone-formaldehyde organic reaction mass employed.

*Example 5*

80 parts of "Thiokol liquid polymer LP-2" (average molecular weight approximately 4000) and 20 parts of Product AF-2 and 7.5 parts of lead peroxide were mixed together to uniformity and allowed to stand at room temperature for 72 hours. At the end of that period, the mass was found to have been converted to the substantially solid and rubbery state and hereinafter is known as TAF-1. Simultaneously 100 parts of "Thiokol liquid polymer LP-2" and 7.5 parts of lead peroxide were mixed together and allowed to stand at room temperature for 72 hours. At the end of that period, this product was found to be a substantially solid rubbery mass and was used as a control for comparison and is hereinafter known as Product CT. A sample of Product CT and a like size sample of TAF-1 were placed in an oven maintained at a temperature of 500° F. They were allowed to remain there for a period of 5–15 minutes after which they were examined. Examination revealed that the sample of CT had fused and flowed whereas Sample TAF-1 maintained its original form, had not fused and was still in the substantially solid rubbery mass.

*Example 6*

Following the same procedure as before and using 70 parts of "Thiokol liquid polymer ZL-100" (average molecular weight about 300), 30 parts of Product AF-3 and 10 parts of lead peroxide, there was produced a substantially solid rubbery mass hereinafter known as TAF-2 having high heat resistance characteristics.

*Example 7*

Following the same procedure as that set forth in Example 5 and using 75 parts of "Thiokol liquid polymer LP-3" (average molecular weight about 1200), 25 parts of Product AF-1 and 15 parts of lead peroxide, there was produced a substantially solid rubbery mass hereinafter known as TAF-3.

Of course, it is to be understood that the foregoing examples have been given merely by way of illustration and are in no way to be taken by way of limitation. The proportions of the "Thiokol" liquid polymer to the acetone-formaldehyde reaction mass may be varied within the limits hereinbefore set forth to obtain novel and highly useful products, and the particular acetone-formaldehyde reaction masses may also be varied within the ranges of those heretofore set forth as may be the particular curing agent and quantities thereof.

The novel combinations of the "Thiokol" liquid polymers together with the acetone-formaldehyde reaction masses and curing agent therein may be used as casting media, coating media or applied in any other manner and thereafter set at room temperature to provide a wide variety of highly useful articles of manufacture such as hose, belts, resinous coverings and coatings where chemical and heat resistance are required.

Such combination may be spread as a thin layer onto a subdecking or flooring and allowed to set to provide chemical and heat resistant floor covering. They may also be used as laminating materials and for various other purposes for which such liquid polymers have heretofore been employed.

It is to be understood that the following claims are intended to cover all the generic and specific features of the invention herein described and all statements of the scope of the invention which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

We claim:

1. A novel composition of matter comprising the combination of (I) a normally liquid polymer which in chemical structure has the repeating unit of $$-SSCH_2CH_2OCH_2OCH_2CH_2-$$

and the terminals being the SH groups, and (II) acetone-formaldehyde resinous organic reaction mass produced by reacting acetone and formaldehyde in the mole ratio of 1 of the former to 2–6 of the latter in the presence of an alkaline agent, the ratio by weight of (I) to (II) being 100 parts of (I) to 5–100 parts of (II).

2. A novel composition of matter comprising a combination defined in claim 1, said combination converted to the substantially solid state.

3. A novel composition of matter comprising a composition of matter defined in claim 1, said combination converted to the substantially solid state in the presence of lead peroxide.

4. A novel composition of matter defined in claim 1 with the mole ratio of acetone to formaldehyde being 1 of the former to approximately 4 of the latter.

5. A novel composition of matter defined in claim 1 with said normally liquid polymer having an average molecular weight of approximately 4000.

References Cited in the file of this patent

UNITED STATES PATENTS 2,410,623  Ballard et al. _____ Nov. 5, 1946
2,466,963  Patrick et al. _____ Apr. 12, 1949

OTHER REFERENCES

Fisher: Ind. Eng. Chem., 31, 941–945 (1939).
Thiokol Liquid Polymer LP-2 (1948), publication of the Thiokol Corporation, Trenton, New Jersey, 18 pages.